(12) United States Patent
Turner et al.

(10) Patent No.: US 7,962,276 B2
(45) Date of Patent: Jun. 14, 2011

(54) COMBUSTION CHAMBER DEACTIVATION SYSTEM

(75) Inventors: James William Griffith Turner, Wymondham (GB); Nebojsa Milovanovic, Gillingham (GB)

(73) Assignee: Lotus Cars Limited, Norfolk (GB)

( * ) Notice: Subject to any disclaimer, the term of this patent is extended or adjusted under 35 U.S.C. 154(b) by 0 days.

(21) Appl. No.: 12/941,978

(22) Filed: Nov. 8, 2010

(65) Prior Publication Data

US 2011/0048347 A1 Mar. 3, 2011

Related U.S. Application Data

(62) Division of application No. 11/663,130, filed as application No. PCT/GB2005/003642 on Sep. 21, 2005.

(30) Foreign Application Priority Data

Sep. 21, 2004 (GB) ................................. 0420978.9

(51) Int. Cl.
*G06F 19/00* (2006.01)
*F01L 9/04* (2006.01)
(52) U.S. Cl. ..................................... 701/108; 123/90.11
(58) Field of Classification Search .................. 701/108, 701/109, 115, 102; 123/90.11, 90.15, 90.16, 123/90.17, 198 DB, 198 F, 568.11, 568.21
See application file for complete search history.

(56) References Cited

U.S. PATENT DOCUMENTS

| | | | |
|---|---|---|---|
| 4,462,351 A | 7/1984 | Fujii et al. | |
| 4,860,709 A * | 8/1989 | Clarke et al. | 123/90.15 |
| 5,038,739 A * | 8/1991 | Ishii | 123/481 |
| 5,345,904 A | 9/1994 | Dopson et al. | |
| 5,682,854 A | 11/1997 | Ozawa | |
| 5,782,088 A | 7/1998 | Gunther et al. | |
| 5,934,263 A * | 8/1999 | Russ et al. | 123/568.14 |
| 6,016,788 A * | 1/2000 | Kibe et al. | 123/568.21 |
| 6,662,785 B1 | 12/2003 | Sloane et al. | |
| 6,681,751 B1 | 1/2004 | Ma | |
| 6,868,840 B2 * | 3/2005 | Lewallen | 123/568.12 |
| 6,955,144 B2 * | 10/2005 | Sakai et al. | 123/90.11 |
| 7,047,910 B2 | 5/2006 | Hedman | |
| 7,051,687 B2 * | 5/2006 | Shimizu et al. | 123/90.11 |

FOREIGN PATENT DOCUMENTS

| | | |
|---|---|---|
| DE | 2838682 A1 | 3/1980 |
| DE | 19500761 A1 | 7/1996 |
| GB | 2093909 A1 | 9/1982 |
| GB | 2367859 A | 4/2002 |

* cited by examiner

*Primary Examiner* — Hieu T Vo
(74) *Attorney, Agent, or Firm* — Fulwider Patton LLP (57) ABSTRACT

The present invention relates to an internal combustion engine comprising: a plurality of combustion chambers (41,42,43,44); an air induction system (45,45A,45B,46,47) for delivering air to each combustion chamber (41,42,43,44); a fuel system for delivering fuel to each combustion chamber (41,42,43,44); an exhaust system (48,50) for relaying combusted gases from the combustion chambers (41,42,43,44) to atmosphere; and an exhaust recirculation system (49,51) to relay combusted gases from the exhaust system (48,50) to at least one of the combustion chambers (42,43). The engine has a chamber deactivation operating mode in which at least one combustion chamber (41,44) is active and receives fuel and air which are combusted therein and at least one other combustion chamber (42,43) is deactivated and is supplied with no fuel by the fuel system. In the chamber deactivation operating mode the exhaust gas recirculation system (49,51) supplies combusted gas to the (or each) deactivated combustion chamber (42,43).

31 Claims, 7 Drawing Sheets

COMBUSTION CHAMBER DEACTIVATION SYSTEM

This is a divisional application of U.S. application Ser. No. 11/663,130, filed Mar. 16, 2007, which is a U.S. national phase of PCT/GB05/003642, filed Sep. 21, 2005, which claims priority from Great Britain Application Serial No. 0420978.9, filed Sep. 21, 2004.

The present invention relates to a multiple combustion chamber internal combustion engine with a combustion chamber deactivation system which can deactivate some of the combustion chambers.

It is well known that it can be desirable to deactivate some combustion chambers of a multiple combustion chamber engine, in order to improve engine efficiency, in particular fuel economy, in part load operating conditions of the engine. It is also well known that an engine, in particular gasoline engines, can be operated in certain circumstances using Controlled Auto-Ignition (CAI), sometimes called Homogeneous Charge Compression Ignition (HCCI). With CAI fuel is mixed with charge air and previously combusted gases and then the mixture compressed and ignited by compression ignition. It has been desired to provide an engine which can both operate with combustion chamber deactivation in some circumstances and with CAI in all combustion chambers in other circumstances. This can prove difficult for reasons discussed below. The present invention seeks to address this need.

The present invention provides an internal combustion engine comprising:

a plurality of combustion chambers;

an air induction system for delivering air to each combustion chamber;

a fuel system for delivering fuel to each combustion chamber;

an exhaust system for relaying combusted gases from the combustion chambers to atmosphere; and an exhaust recirculation system to relay combusted gases from the exhaust system to at least one of the combustion chambers;

wherein:

the engine has a chamber deactivation operating mode in which at least one combustion chamber is active and receives fuel and air which are combusted therein and at least one other combustion chamber is deactivated and is supplied with no fuel by the fuel system characterised in that:

in the said chamber deactivation operating mode the exhaust gas recirculation system supplies combusted gas to the (or each) deactivated combustion chamber.

Figure 1:
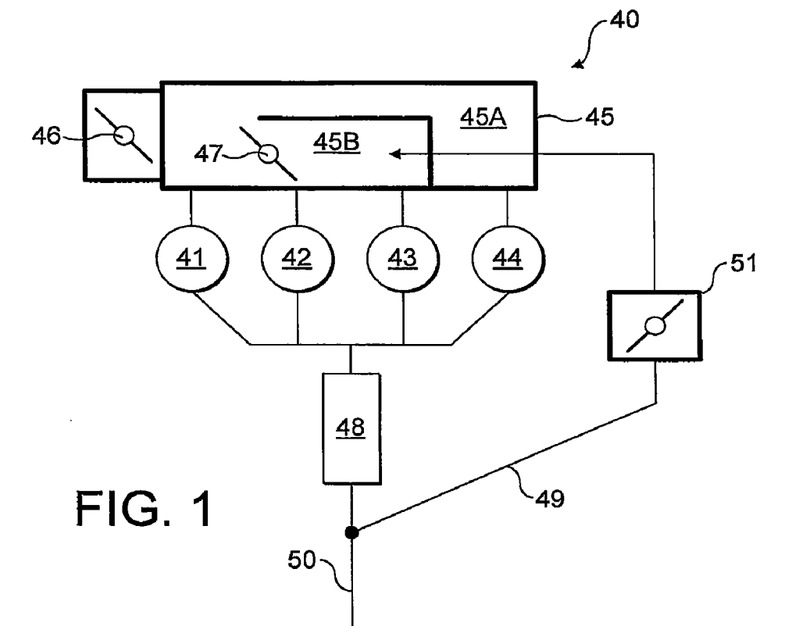
FIG. 1 is a schematic illustration of a "straight four" multiple combustion chamber engine having a common catalytic converter for all chambers and configured according to the present invention.

Preferred embodiments of the present invention will now be described with reference to the accompanying drawings, in which:

FIG. 1 shows an engine with four cylinders 41, 42, 43, 44 supplied with air from a plenum 45.

Flow of air into the plenum 45 is controlled by an electrically operated throttle 46. The plenum itself is divided into two plenum chambers 45A and 45B. A plenum valve 47 controls flow of air from plenum chamber 45A to plenum chamber 45B.

Air supplied to the cylinders 42, 43 must pass through the plenum chamber 45A and then plenum chamber 45B. Thus when the valve 47 is closed no air can flow via the throttle valve 46 into the cylinders 42, 43.

All four cylinders 41, 42, 43, 44 are connected to a common catalytic converter 48. Downstream of the catalytic converter 48 an exhaust recirculation passage 49 is connected to an exhaust pipe leading from the catalytic converter 48. The exhaust recirculation passage can recirculate exhaust gas into the plenum chamber 45B. The flow of exhaust gases through the recirculation passage 49 is controlled by an electrically operated recirculation valve 51.

The engine 40 can operate either with all cylinders 41 to 44 active or with the cylinders 42, 43 deactivated and cylinders 41, 44 active. To switch from an operating mode in which all cylinders are active to a chamber-deactivated operating mode the valve 47 is closed and the fuel injector(s) for the cylinders 42, 43 deactivated. Then the valve 51 is opened so that the cylinders 42, 43 draw into them combusted gases through the recirculation passage 49.

The circulation of post-catalyst exhaust gases back through the deactivated cylinders 42, 43 reduces losses otherwise occasioned by the cyclical creation of a vacuum in the cylinders 42, 43. At the same time the cylinders 42, 43 are kept hot and the catalytic converter 48 is not cooled by a flow of cool fresh air through the deactivated cylinders.

The electrically operated throttle 46 and the electrically operated valves 47 and 51 are all controlled by the controller 31.

Figure 2:
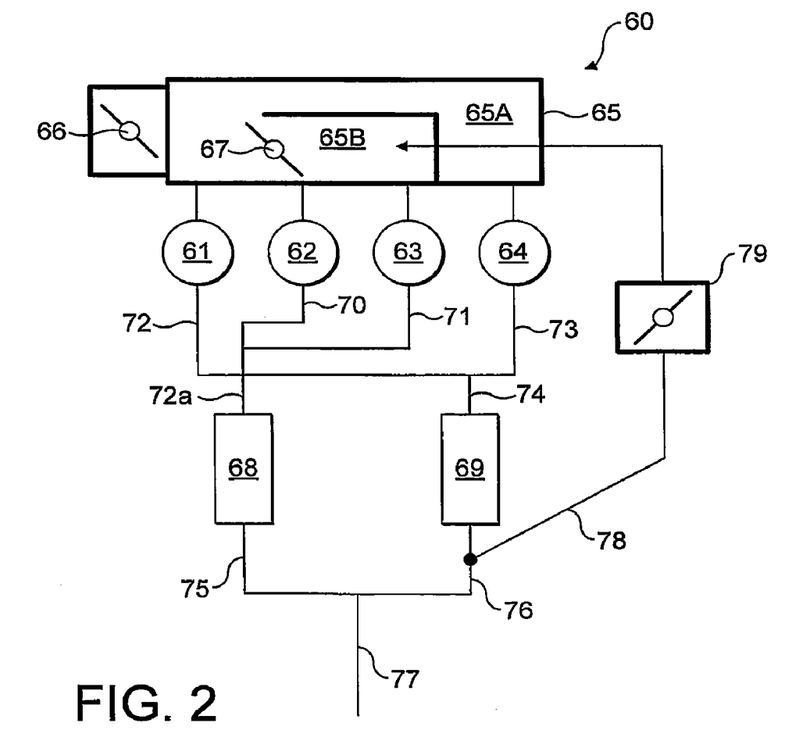
FIG. 2 is a schematic illustration of a "straight four" multiple combustion chamber engine having twin catalytic converters and configured according to the present invention.

A second embodiment of engine according to the present invention is illustrated in FIG. 2. In the figure an engine 60 has four cylinders 61, 62, 63, 64 fed from a plenum 65. As with the first embodiment flow of air into the plenum 65 is controlled by an electrically operated throttle 66 and the plenum is split into two plenum chambers 65A and 65B. An electrically operated valve 67 controls flow of air from plenum chamber 65A into 65B. Cylinders 41, 44 draw air directly from the plenum chamber 65A, while cylinders 62, 63 draw air from chamber 65A only via plenum chamber 65B.

Unlike the first embodiment, the FIG. 2 embodiment has two catalytic converters 68, 69 which operate in parallel. The catalytic converter 68 receives combusted gases from the cylinders 62, 63 via exhaust runners 70,71 which join together in exhaust pipe 72a and the catalytic converter 69 receives combusted gases from the cylinders 61,64 via exhaust runners 72, 73 which join together in exhaust pipe 74.

Exhaust gases flowing out of the catalytic converter 68 pass through an exhaust pipe 75 to join with exhaust gases flowing from the catalytic converter 69 via an exhaust pipe 76, the mixed exhaust gases then flowing to atmosphere via an exhaust pipe 77.

The engine is provided with an exhaust recirculation passage 78 which is connected to the exhaust pipe 76, downstream of the catalytic converter 69 and upstream of the point of connection of the exhaust pipe 76 to the exhaust pipe 75 (i.e. the point at which post-catalytic gases flowing from the catalytic converter 68 are mixed with post-catalytic gases flowing from the catalytic converter 69). Flow of combusted gases through the recirculation passage 78 is controlled by an electrically operated recirculation valve 79.

When operation of the engine is changed from a state in which all cylinders 61 to 64 are active to a state in which cylinders 62, 63 are inactive then the electrically operated valve 67 is closed to seal off the plenum chamber 65B from the plenum chamber 65A, the fuel injector(s) for the cylinders 62, 63 is/are deactivated and then the exhaust recirculation valve 79 is opened so that the deactivated cylinders 62, 63 draw in post-catalyst exhaust gas from the exhaust pipe 76 at a point downstream of the catalytic converter 69. The exhaust gases are drawn into cylinders 62,63 via the plenum chamber 65B whilst the plenum chamber 65B is sealed off from chamber 65A.

The FIG. 2 engine operates so that during cylinder deactivation the de-activated cylinders 62,63 draw into them combusted gases generated in the still active cylinders 61, 64 (after they have passed through the catalytic converter 69). Thus part of the combusted gases generated by combustion in cylinders 61,64 flow through the catalytic converter 69, then through the exhaust recirculation passage 78 and the plenum chamber 65B to be drawn into the cylinders 62,63 and then expelled via the catalytic converter 68 to atmosphere. This has the advantage that the cylinders 62,63 do not give rise to losses occasioned by cyclically creating vacuums in the cylinders 62,63 and the combusted gases keep hot the cylinders 62,63 and the catalytic converter 68.

Figure 3:
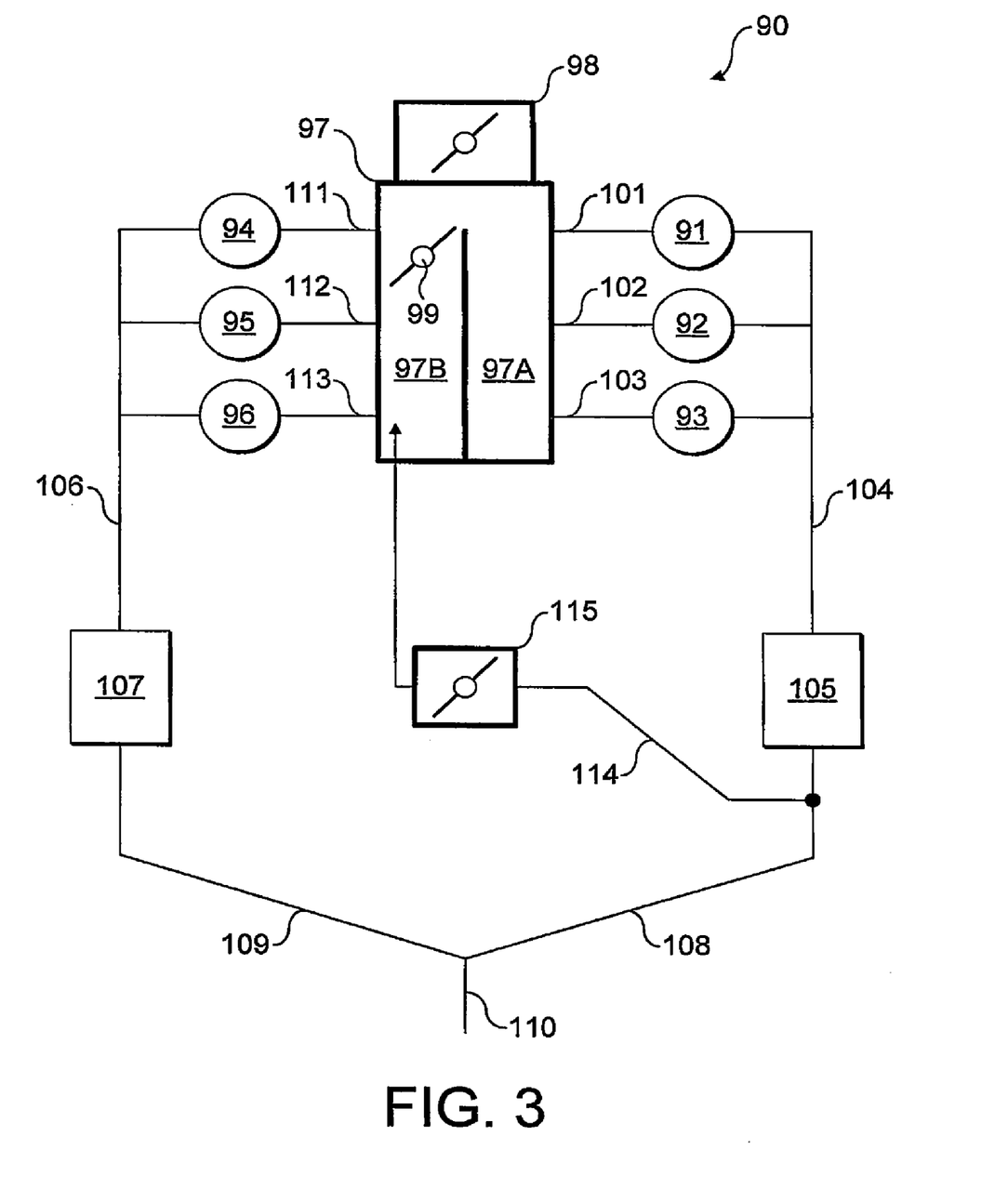
FIG. 3 is a schematic illustration of a "V6" multiple combustion chamber engine configured according to the present invention.

FIG. 3 shows schematically a V6 engine 90 according to the present invention, having six cylinders 91, 92, 93, 94, 95, 96 fed with air from a plenum 97. The flow of air into the plenum 97 is controlled by an electrically operated throttle 98. The plenum 97 is internally divided into a plenum chamber 97A from which air is drawn by one bank of cylinders 91, 92, 93 and a plenum chamber 97B from which air is drawn by the other bank of cylinders 94, 95, 96. Flow of air into the chamber 97B is controlled by an electrically controlled plenum valve 99 which can seal off the plenum chamber 97B from the remainder of the plenum.

Three exhaust runners 100, 101, 102 lead combusted gases from the cylinders 91, 92, 93 to a common exhaust pipe 104 which delivers the combusted gases to a catalytic converter 105. Three exhaust runner 111,112,113 lead combusted gases from the cylinders 94, 95, 96 to a common exhaust pipe 106 which in turn leads them to catalytic converter 107. The combusted gases leaving the catalytic converters 105, 107 flow respectively along exhaust pipes 108 and 109 until they join together to flow along a common exhaust pipe 110 to atmosphere.

An exhaust recirculation passage 114 is joined to the pipe 108 downstream of the catalytic converter 105 and upstream of the point at which the pipe 108 joins pipes 109 and 110 (i.e. upstream of the mixing of the combusted gases in pipe 108 with those in pipe 109). The exhaust recirculation passage 114 can deliver recirculated combusted gases to the plenum chamber 97B. An exhaust gas recirculation valve 115 controls flow of gases through the recirculation passage 114.

To switch from an operating mode in which all the cylinders 91 to 96 are active to an operating mode in which cylinders 91 to 93 are active and the cylinders 94 to 96 deactivated, the valve 99 is closed to seal off the chamber 97B and the fuel injectors for the cylinders 94 to 96 are deactivated. The valve 115 is opened and the cylinders 94, 95, 96 draw combusted gases through the passage 114. Thus combusted gases flow out of the active cylinders 91 to 93 through the catalytic converter 105 and then a portion of the combusted gases flow along the recirculation passage 114 to the chamber 97B to then be drawn into the cylinders 94 to 96 and subsequently expelled via the catalytic converter 107 to atmosphere.

The recirculation of combusted gases from cylinders 91 to 93 through the cylinders 94 to 96 and catalytic converter 107 serves to keep the cylinders 91 to 93 and the catalytic converter 107 hot and to prevent dissipation of energy through the creation of vacuums in the deactivated cylinders.

Figure 4:
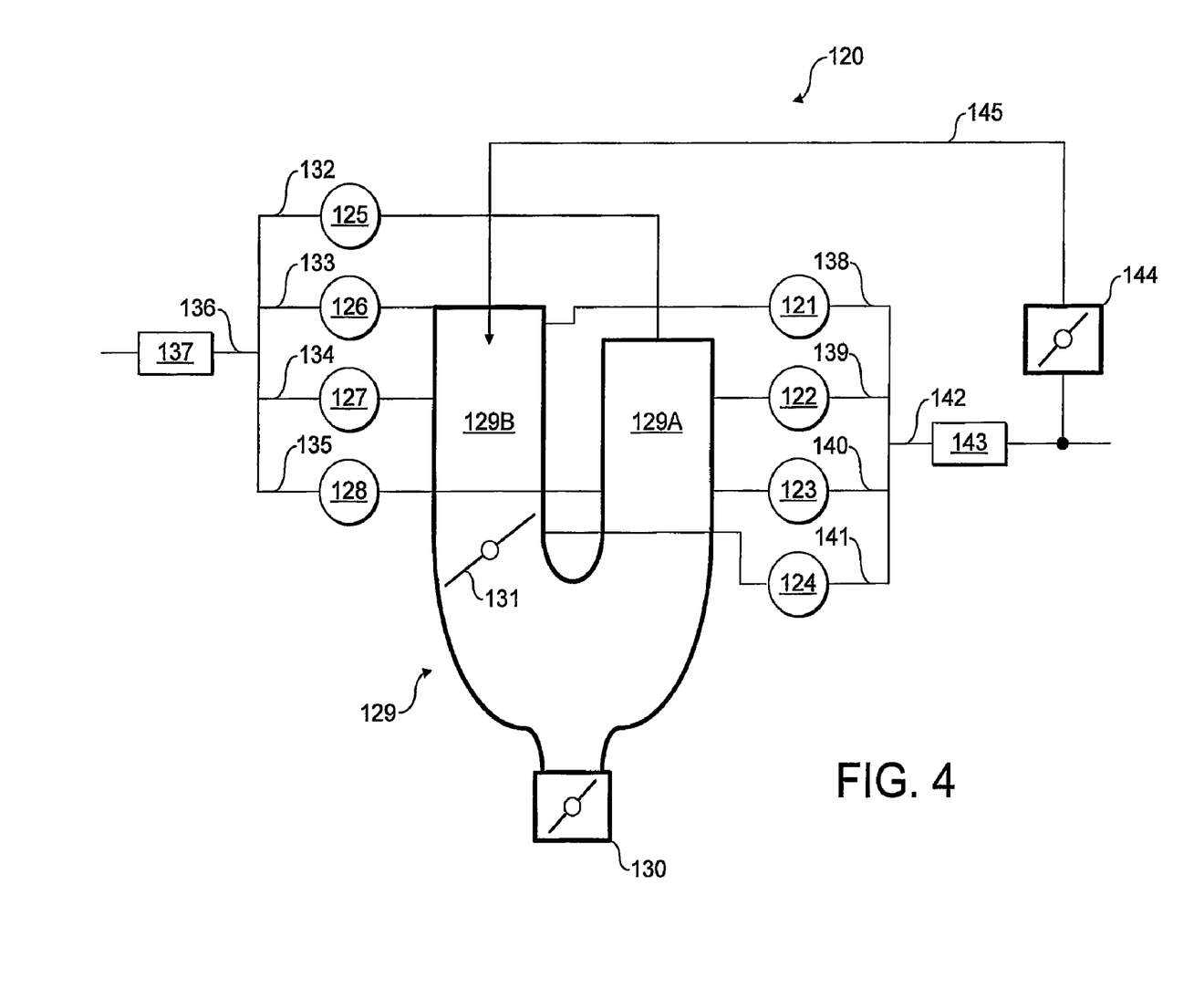
FIG. 4 is a schematic illustration of a "Cross-Plane Crank V8" multiple combustion chamber engine configured according to the present invention.

FIG. 4 shows as a fourth embodiment of the present invention a cross-plane crank V8 engine 120 having two banks of four cylinders, a first bank of cylinders 121 122, 123, 124 and a second bank of cylinders 125, 126, 127, 128. Air is supplied to all of the cylinders by a plenum 129 and the flow of air into the plenum 129 is controlled by an electrically operated throttle valve 130. The plenum 129 is divided into two plenum chambers 129A and 129B, with the plenum chamber 129A supplying air to the cylinders 122,123,125,128 and with the chamber 129B supplying air to the cylinders 121, 124, 126, 127. An electrically operated valve 131 can close to seal off the chamber 129B from the remainder of the plenum 129.

Combusted gases expelled from the cylinders 125 to 128 flow through exhaust runners 132, 133, 134,135 to a common exhaust pipe 136 and then through a catalytic converter 137 to atmosphere. Combusted gases expelled from the cylinders 121 to 124 flow through exhaust runners 138, 139, 140, 141 into a common exhaust pipe 142 and then via a catalytic converter 143 to atmosphere.

The engine 120 is provided with an exhaust recirculation passage 145 which can draw post-catalyst combusted gases from the exhaust pipe 142 downstream of the catalytic converter 143 and deliver them to the chamber 129B of the plenum 129. An exhaust recirculation valve 144 controls flow of gases through the passage 145.

When switching from an operating condition in which all of the cylinders are active to an operating condition in which the cylinders 121, 124, 126, 127 are deactivated then the plenum valve 131 seals off the chamber 129B and the injectors for the cylinders 121, 124, 126, 127 are deactivated. The valve 144 is opened and then the combusted gases are drawn from the exhaust pipe 142 (downstream of the catalytic converter 143) through the exhaust recirculation passage 145 into the plenum chamber 129B and therefrom into the cylinders 121, 124, 126, 127.

During valve deactivation the catalytic converters 137, 142 each continue to receive combusted gases from two of the active cylinders 122, 123, 125, 128 and so keep hot. The combusted gases drawn into the deactivated cylinders also keep them hot.

Figure 5:
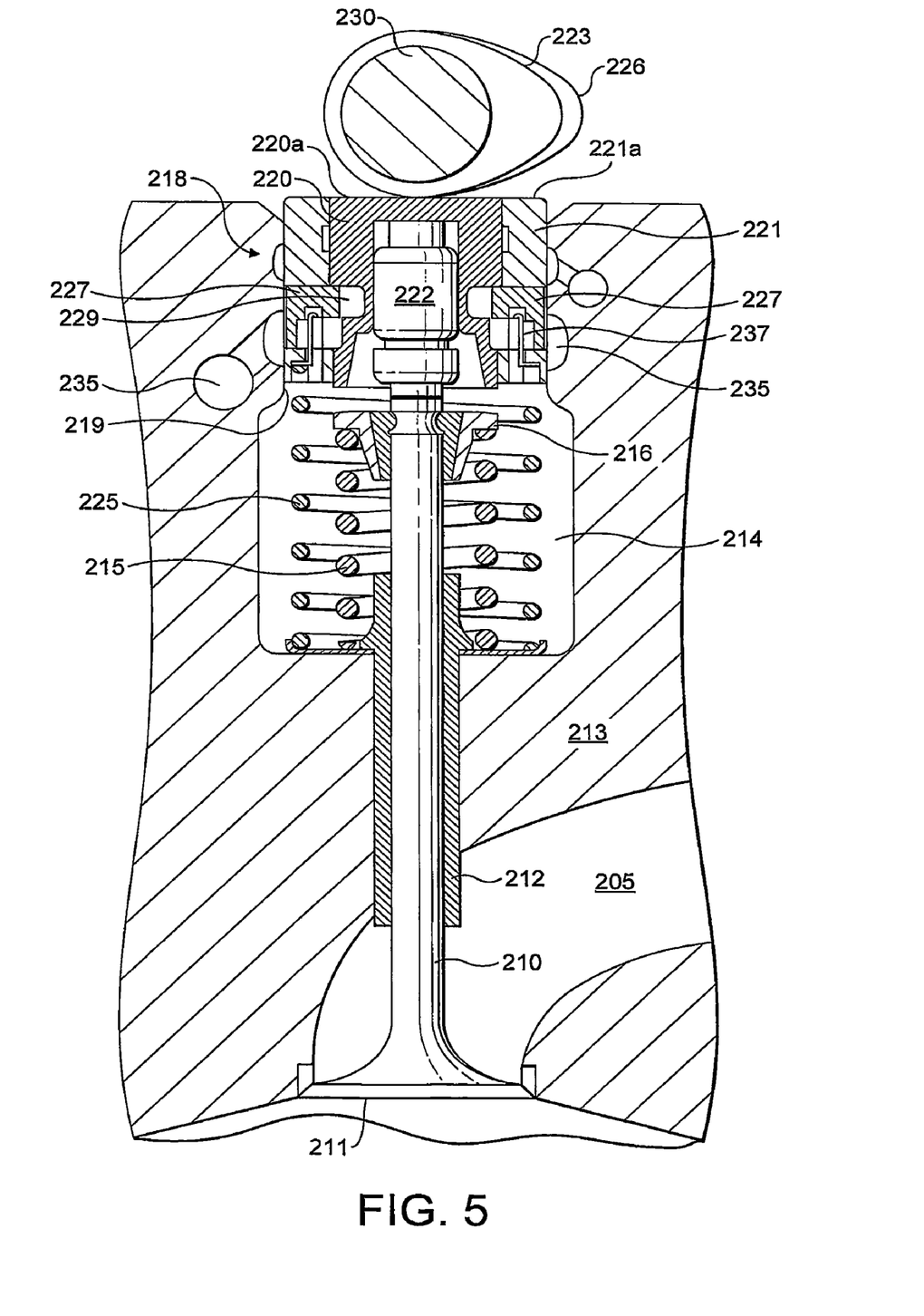
FIG. 5 is a cross-sectional view of a part of a cylinder head of an engine, showing in cross-section a first valve control mechanism suitable for use in controlling the cylinder head inlet valves of the engine of FIGS. 1 to 4.
Figure 6:
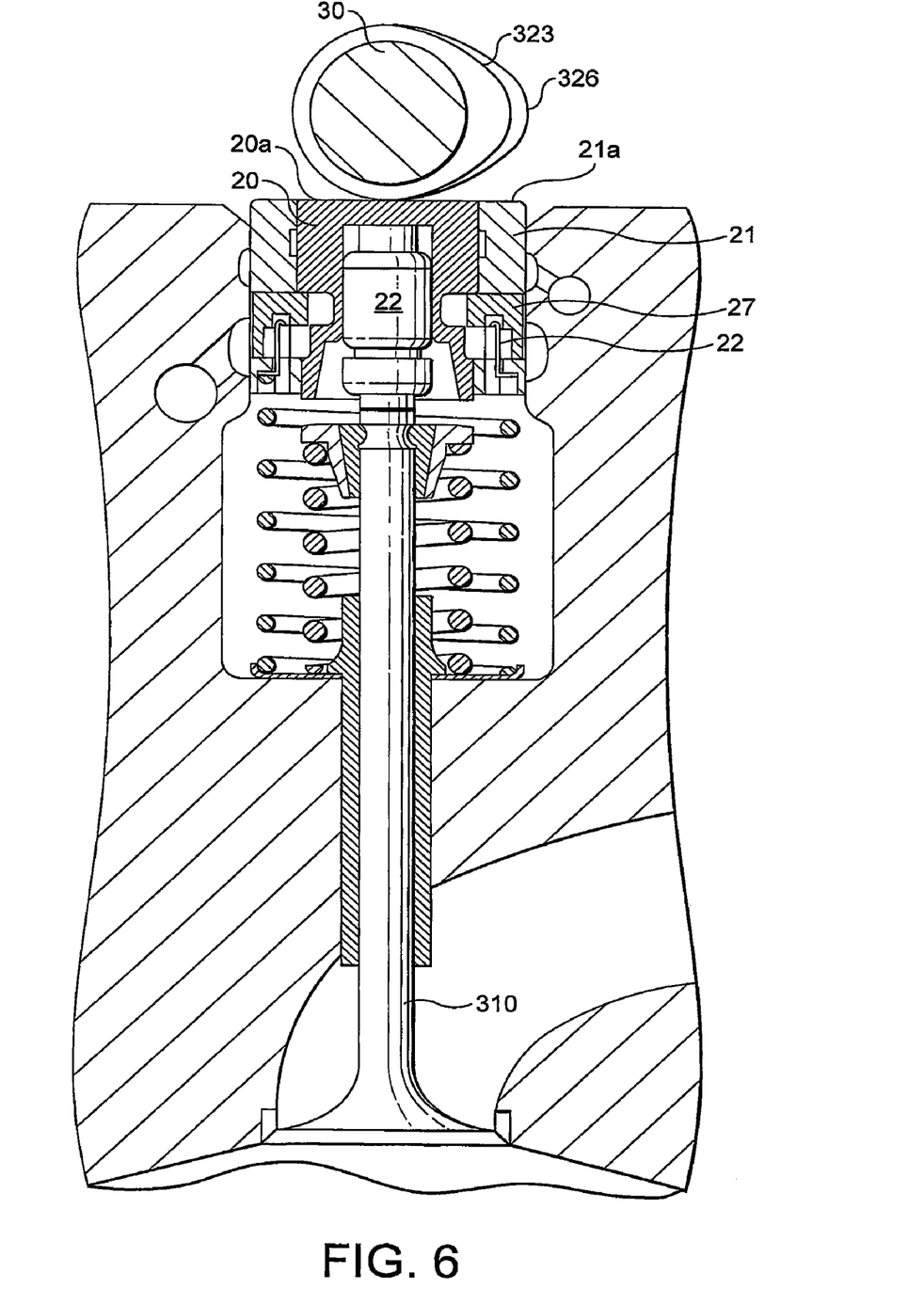
FIG. 6 is a cross-sectional view of a part of a cylinder head of an engine, showing in cross-section a second valve control mechanism suitable for use in controlling the cylinder head exhaust valves of the engine of FIGS. 1 to 4.
Figure 7:
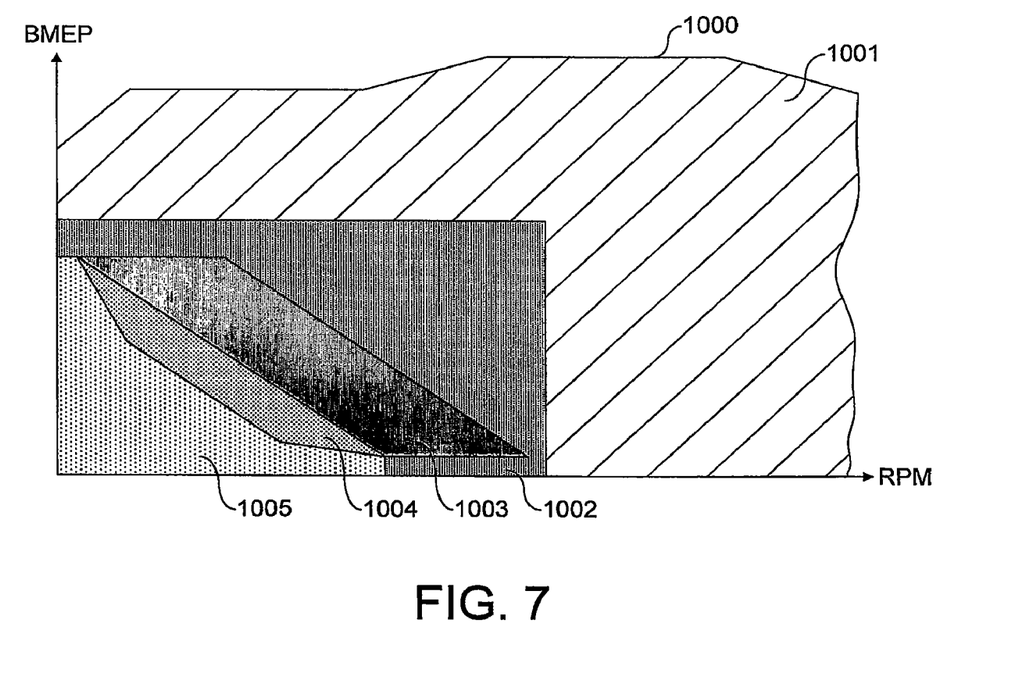
FIG. 7 is a graphical representation of how an engine according to the present invention and having the valve control mechanism of FIG. 6 can operate in different combustion modes at different speeds and loads.

A valve operating mechanism as shown in FIG. 5 could be used for each inlet valve of the engines of FIGS. 1 to 4 and a valve operating mechanism is shown in FIG. 6 could be used for each exhaust valve of the engine of FIGS. 1 to 4 so that the engines could be operated according to the operating map of FIG. 7.

Referring to FIG. 5 there is shown an inlet valve 210 having a head 211 which is movable in an axial direction to seal the passageway 205. The inlet valve 210 is slidably mounted in a bore 212 in cylinder block 213 and passes through a cavity 214. In the cavity 213 around valve 210 there is located a spring 215 one end of which rests against a lower surface of said cavity 214 and the other end of which is located in a collar 216 mounted on the inlet valve 210 so as to generally bias the inlet valve 210 in an upwards direction.

Mounted on an upper end of the inlet valve 210 is a tappet assembly 218. The tappet assembly 218 comprises a co-axial inner tappet 220 and outer tappet 221. The inner tappet bears on a hydraulic lash adjustment element 222 of known type which in turn bears on the upper end of the inlet valve 210. The tappet assembly 218 is slidably mounted within bore 219 which extends from the cavity 214 to the upper surface of the cylinder block 213. A cylinder head cover may be positioned over and secured to the upper surface of the cylinder block 213.

Located above the cylinder block 213 is a rotatable camshaft 230 which is drivable in the usual manner, and on which can be seen an outer cam 226 and an inner cam 223. The outer cam 226 is one of a pair of cams of identical profile which sandwich the inner cam 223.

An upper surface 220a of the inner tappet 220 is driven by the inner cam 223. An upper surface 221a of the outer tappet 221 is kept in contact with the outer cams (e.g. 226) by means of a spring 225 which is co-axially positioned around spring 215 and which is located at one end in recesses in the lower end surface of outer tappet 221. At its lower end the spring 225 bears on the lower surface of cavity 214.

Cam profile selection is achieved by either connecting the inner tappet 220 and outer tappet 221 so that they move together which allows the outer tappet 221 and outer cams (e.g. 226) to control the valve 210 or by disconnecting the inner tappet 220 and outer tappet 221, which allows the inner tappet 220 and inner cam 223 to control valve 210.

One method of achieving the connection is by the use of locking pins 227. The locking pins 227 slide in transverse bores in the outer tappet 221 and are engageable with a stepped diameter 229 on the inner tappet 220 while the tappets 220 and 221 are both engaged by base circle portions of the cams 223, 226, i.e. whilst the valve 210 is closed.

In FIG. 5 the locking pins 227 are in their retracted position. The pins 227 can be held in this position by either return springs 237 or oil pressure on their inboard surfaces. With the pins 227 in this position there is no connection between the inner tappet 220 and outer tappet 221. Since outer tappet 221 moves against spring 225, the inlet valve 210 is driven solely by the inner tappet 220 and by central cam 223.

The locking pins 227 can be forced inwards by hydraulic oil pressure on their outer surfaces provided by gallery feed 235. The oil pressure must be sufficient to overcome the spring force or oil pressure on the inner surface of the locking pins 227. In this position the locking pins 227 engage with the stepped diameter 229 on the inner tappet 220 thus forming a driving connection between the inner tappet 220 and outer tappet 221.

The outer cams (e.g. 226) each have a lift profile of a greater lift and duration than the inner cam 223. When both tappets 220, 221 are constrained to move together then the profile of the outer cams (e.g. 226) governs the movement of inlet valve 210.

When driven by the outer cam 226 the inlet valve closes at or around the end of each intake stroke. When driven by the inner cam 223 the inlet valve closes before the piston reaches bottom dead centre, to effectively reduce the length of inlet stroke (as compared to the length of the inlet stroke when the inlet valve is operated by the cam 226). This also has the effect of reducing the effective length of the immediately subsequent compression stroke, since the air in the cylinder at the end of the intake stroke is expanded and its pressure reduced so that the first part of the compression stroke is taken up in compressing the air back to its pre-expanded pressure before any effective compression of the charge takes place.

FIG. 6 shows an operating mechanism identical to the operating mechanism of FIG. 5 save in two respects (therefore common reference numerals have been used and the operation of the FIG. 6 will not be described since reference can be made to the description relating to FIG. 5). First, the valve shown is an exhaust valve 310, not an inlet valve. Secondly the profile of the two cams 323 and 326 are different to the profiles of the cams 223 and 226. The cam 326 provides for exhaust valve opening at the beginning of each exhaust stroke and closing of the exhaust valve at about the end of each exhaust stroke. The cam 323 on the other hand, provides for a lower maximum lift of the exhaust valve 310 and also provides for closing of the exhaust valve 310 prior to the end of the each exhaust stroke so that combusted gases are trapped in the cylinder for mixing with subsequently introduced fuel/air charge.

The engine having the cam mechanism described above will also have a cam phaser mechanism of a known type to vary the timing of the start and end of each valve event in relation to crankshaft position.

In FIG. 7 there is an engine operating map with engine load (e.g. measured by Brake Mean Effective Pressure, BMEP) on the "y" axis and engine speed (e.g. measured revolutions per minute, RPM) on the "x" axis. The line 1000 denotes limit conditions. Each of the described engines of FIGS. 2, 4, 5, 6 can operate as illustrated in the figure and as described below.

In the operating area 1001 the engine will operate conventionally with all cylinders active each running a four-stroke OTTO cycle—in this condition all of the valves will run on the high lift cams of the valve operating mechanism.

In the region 1002 all cylinders are again active but the inlet and exhaust valves are operated so that each cylinder operates a Miller cycle, i.e. a four-stroke operating cycle in which the compression stroke is shorter than the expansion stroke. This is achieved by driving the inlet valves using the low lift, short duration cams (e.g. 223) of the valve operating mechanisms, which close the inlet valves before the bottom dead centre position of the piston so as to effectively shorten the following compression stroke (as described above). Some variation of cam phasing may also be desired. The exhaust valves will still be driven by the high lift cams (e.g. 326).

In the region 1003 the engine operates with all four cylinders running with CAI (Controlled Auto-Ignition). This is achieved by driving the exhaust valves using the low lift cams (e.g. 323) so as to close early in each exhaust stroke to trap combusted gases for mixing with fuel and air delivered to the cylinder in the next induction stroke and mixing the trapped combusted gases with the fuel and air and then the mixture combusting due to compression ignition. Again, variation of cam phasing may also be desired.

In the region 1004 some cylinders (e.g. 2 out of 4; 3 out of 6; 4 out of 8) are deactivated in the manner described above with the active cylinders operating CAI (with the exhaust valves thereof trapping combusted gases for mixing with fuel/air charge as previously described). Once more, some variation of cam phasing may be needed.

In region 1005 again some cylinders are deactivated in the manner described above and the remaining active cylinders operate a 4-stroke Miller cycle as described above. Again, some cam phasing may be desirable.

By providing different operating regions 1001, 1002, 1003, 1004, 1005 with different methods of combustion operation, efficiency is improved.

The present invention facilitates the switching of an engine between the operating conditions 1001-1005 because the deactivated cylinders and the catalytic converter for the deactivated cylinders are all kept hot by passing through them combusted gases generated in the still active cylinders. CAI is only achievable in a combustion chamber if the chamber is sufficiently hot. If a chamber is cooled by passing therethrough cool fresh charge air when the chamber is deactivated then it will not be possible (or at least it will be very difficult) to achieve CAI in the chamber without first running several conventional cycles (e.g. OTTO cycles) in the chamber first to heat it up.

Figure 8:
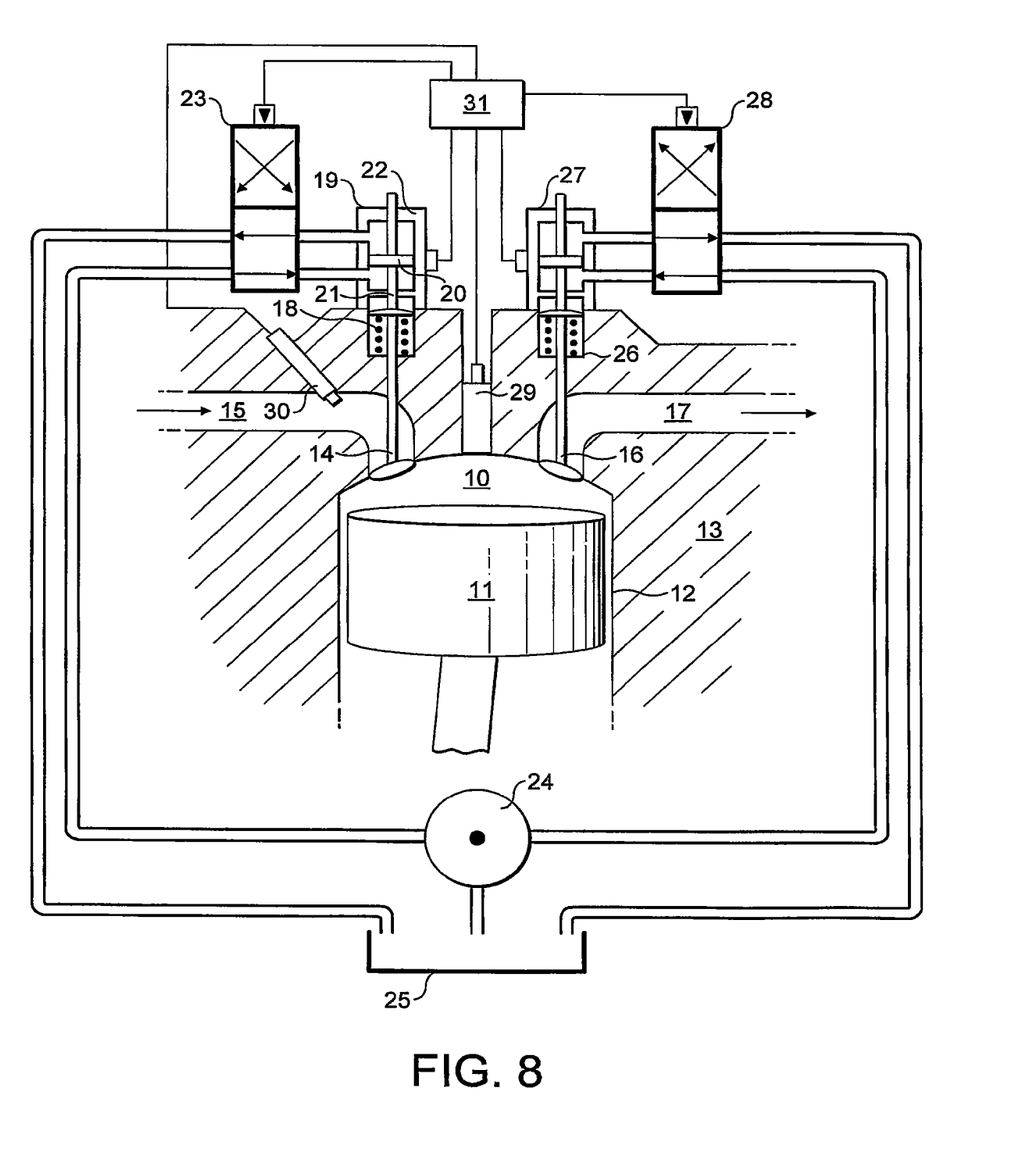
FIG. 8 is a cross-sectional view of a part of a cylinder head in an engine, showing in cross-section a second valve control mechanism suitable for controlling the cylinder head valves of the engine of FIGS. 1 to 4.

The engines of FIGS. 1, 2, 3, 4 could in another alternative each have valve control mechanisms for each inlet and exhaust valve as shown in FIG. 8. The use of the hydraulically actuated inlet and exhaust valves enables each engine to operate in the variety of different operating conditions, described above with reference to FIG. 7.

Turning now to FIG. 8 there can be seen in the Figure a combustion chamber 10 defined by a piston 11 reciprocating in a cylinder 12 defined in a cylinder block 13. An inlet poppet valve 14 controls flow of fuel/air charge into the combustion chamber 10 from an inlet runner 15. An exhaust poppet valve 16 controls flow of combusted gases from the combustion chamber 10 to an exhaust runner 17.

The inlet valve 14 is spring-loaded into the closed position shown in FIG. 1 by a valve spring 18. The valve 14 is operated by a hydraulic actuator 19. The actuator 19 comprises a piston 20 attached to a rod 21 which extends out of an actuator housing 22 to abut the valve 14. The actuator housing 22 has a chamber in which the piston 20 moves. Flow of hydraulic fluid to and from the chamber is controlled by an electrically operated servo-valve 23. The servo-valve 23 is connected to a pump 24 and to a sump 25 from which the pump 24 draws fluid. The servo-valve 23 can connect a lower part of the actuator chamber to receive pressurised fluid from the pump 24 (as shown in FIG. 1) and so an upper part of the actuator chamber is connected to the sump 25 so fluid can flow from the chamber to the sump 25. Thus the piston 20 is forced upward. The servo-valve 23 can alternatively connect the lower part of the actuator chamber to the sump 25 and the upper part to receive fluid from the pump 24; so that the piston 20 is forced downwardly and opens the inlet valve 14.

In a similar fashion the exhaust valve 16 is spring-loaded by a valve spring 26 and operated by a hydraulic actuator 27 under control of a servo-valve 28. The actuator 27 and servo-valve 28 are identical to the actuator 19 and servo-valve 23 and thus will not be separately described.

The engine has a spark plug 29 and a fuel injector 30. An electronic controller 31 controls the operation of the servo-valves 23 and 28 to thereby control the actuators 19, 27. The controller 31 also controls the operation of the fuel injector 30 and the spark plug 29. The controller 31 operates having regard to the position of the piston 11 in the cylinder 10 and having regard to engine load, engine speed and temperature.

An engine with hydraulically operated inlet and exhaust valves (as shown in FIG. 8) is operated according to the operating map of FIG. 7. At high engine speeds/loads each cylinder operates a four stroke OTTO cycle. With all cylinders active it is possible to provide Miller cycle operation in each cylinder either by closing each inlet valve early in each inlet stroke to effectively shorten each inlet stroke and thereby also effectively shorten each subsequent compression stroke; or by keeping each inlet valve open at the beginning of each compression stroke to effectively shorten each compression stroke. It is also possible to deactivate some cylinders and run Miller cycles in each active cylinder again by (in each active cylinder) closing each inlet valve early to reduce each inlet stroke or by keeping each inlet valve open to reduce each compression stroke. It is further possible to provide CAI combustion in all cylinders (or just in active cylinders, when some are deactivated) by closing each exhaust valve early to reduce each exhaust stroke and trap combusted gases for mixing with subsequently introduced fuel/air charge.

The performance of the engines described above could be improved by the use of an inlet manifold of variable length. Designs of such manifolds are well known. For each of the different operating conditions 1001, 1002, 1003, 1004, 1005 the engine performance can be improved by tuning the length of the inlet manifold to best suit the operating condition concerned.

It is envisaged that the engines described above will preferably be provided with phasers on both the inlet and the exhaust cams. The profile of the low lift cams 223 and 323 in one embodiment would provide a lift of 2 mm and a valve open duration of 134 degrees of crank angle—this enables CAI to be induced at low loads and engine speeds. The switching operation could be made temperature dependent and the engine switched in to a CAI combustion mode only when the engine coolant has reached a desired threshold temperature, e.g. 665 degrees Celsius.

When operating with the low lift cam profiles and without fuelling, the deactivated cylinders effectively pump hot exhaust gases to maintain in-cylinder temperatures and also catalyst light off temperatures.

The use of CAI combustion instead of conventional Spark Ignition reduces NOx emissions because it is a more gradual combustion process resulting in lower peak temperatures.

We claim:

1. An internal combustion engine comprising:
   a plurality of combustion chambers;
   an air induction system for delivering air to each combustion chamber;
   a fuel system for delivering fuel to each combustion chamber;
   an exhaust system for relaying combusted gases form the combustion chambers to atmosphere; and
   an exhaust recirculation system to relay combusted gases from the exhaust system to at least one of the combustion chambers;
   wherein:
   the engine has a chamber deactivation operating mode in which at least one combustion chamber is active and receives fuel and air which are combusted therein and at least one other combustion chamber is deactivated and is supplied with no fuel by the fuel system;
   in the said chamber deactivation operating mode the exhaust gas recirculation system supplies combusted gas to the (or each) deactivated combustion chamber;
   a plurality of inlet poppet valves are provided to control flow of air to the combustion chamber(s), the inlet poppet valves being operated by a rotatable camshaft having for each inlet poppet valve a first inlet cam and a second inlet cam with a different profile to the first inlet cam with tappet means being provided for each inlet poppet valve to transmit lift to the inlet poppet valve selectively from the first inlet cam or the second inlet cam;
   in a first operating condition of the engine in which every combustion chamber is active and each inlet poppet valve is driven by the respective first inlet cam therefor; and in a second operating condition of the engine the engine operates in the valve deactivation mode with at least one combustion chamber deactivated and each inlet valve for each active combustion chamber is driven by the respective first inlet cam therefor whereby each active combustion chamber operates a Miller cycle combustion cycle by each first inlet cam for each active combustion chamber closing each inlet poppet valve early to reduce each inlet stroke in each active combustion chamber.

2. An internal combustion engine as claimed in claim 1 having exhaust valve means controlling flow of combusted gases from the combustion chambers and cam means for operating the exhaust valve means, wherein:
the exhaust valve means comprises a plurality of exhaust poppet valves and the cam means comprises a rotatable camshaft having for each exhaust poppet valve a first exhaust cam and a second exhaust cam with a different profile to the first exhaust cam and tappet means is provided for each exhaust poppet valve to transmit lift to the exhaust poppet valve selectively from the first exhaust cam or the second exhaust cam;
in a third operating condition every combustion chamber is active and operates controlled auto-ignition by each exhaust poppet valve being driven by the respective first exhaust cam therefor and closing early to reduce in length each exhaust stroke in each combustion chamber to thereby trap combusted gases in the combustion chamber for mixing with fuel and air subsequently introduced into the combustion chamber; and
in a fourth operating condition at least one combustion chamber is deactivated and at least one combustion chamber is active and each exhaust poppet valve for each active combustion chamber is driven by the respective first exhaust cam therefore so that each active combustion chamber operates controlled auto-ignition by each exhaust poppet valve closing early to reduce in length each exhaust stroke in the active combustion chamber(s) to thereby trap combusted gases in the combustion chamber(s) for mixing with fuel and air subsequently introduced into the combustion chamber.

3. An internal combustion engine as claimed in claim 1 wherein each inlet poppet valve is driven by the respective second inlet cam therefor when the engine operates a fifth operating condition in which every combustion chamber is active and operates in a four-stroke Otto cycle.

4. An internal combustion engine as claimed in claim 3 wherein each exhaust poppet valve is driven by the respective second exhaust cam therefor when the engine operates in the fifth operation condition in which every combustion chamber is active and operates a four-stroke Otto cycle.

5. An internal combustion engine as claimed in claim 1 comprising also a cam phasing mechanism which can alter the rotational position of a camshaft of the cam means relative to the crankshaft of the engine and thereby vary in timing opening and closing of the inlet and/or exhaust poppet valves.

6. An internal combustion engine comprising:
a plurality of combustion chambers;
an air induction system for delivering air to each combustion chamber;
a fuel system for delivering fuel to each combustion chamber;
an exhaust system for relaying combusted gases from the combustion chambers to atmosphere; and
an exhaust recirculation system to relay combusted gases from the exhaust system to at least one of the combustion chambers;

wherein:
the engine has a chamber deactivation operating mode in which at least one combustion chamber is active and receives fuel and air which are combusted therein and at least one other combustion chamber is deactivated and is supplied with no fuel by the fuel system;
in the said chamber deactivation operating mode the exhaust gas recirculation system supplies combusted gas to the (or each) deactivated combustion chamber;
electrically controlled inlet valve means control flow of air into the combustion chambers and electronic control means for varying operation of the inlet valve means having regard to engine load and/or engine speed; and
the engine has a first operating condition in which every combustion chamber is active; and
the engine has a second operating condition in which the engine operates in the valve deactivation mode with at least one combustion chamber deactivated and at least one combustion chamber active and in which each active combustion chamber operates a Miller cycle combustion cycle by keeping the inlet valve means thereof open in an initial part of each compression stroke.

7. An internal combustion engine as claimed in claim 6 having exhaust valve means controlling flow of combusted gases from the combustion chambers and cam means for operating the exhaust valve means, wherein:
the exhaust valve means comprises a plurality of exhaust poppet valves and the cam means comprises a rotatable camshaft having for each exhaust poppet valve a first exhaust cam and a second exhaust cam with a different profile to the first exhaust cam and tappet means is provided for each exhaust poppet valve to transmit lift to the exhaust poppet valve selectively from the first exhaust cam or the second exhaust cam;
in a third operating condition every combustion chamber is active and operates controlled auto-ignition by each exhaust poppet valve being driven by the respective first exhaust cam therefor and closing early to reduce in length each exhaust stroke in each combustion chamber to thereby trap combusted gases in the combustion chamber for mixing with fuel and air subsequently introduced into the combustion chamber; and
in a fourth operating condition at least one combustion chamber is deactivated and at least one combustion chamber is active and each exhaust poppet valve for each active combustion chamber is driven by the respective first exhaust cam therefore so that each active combustion chamber operates controlled auto-ignition by each exhaust poppet valve closing early to reduce in length each exhaust stroke in the active combustion chamber(s) to thereby trap combusted gases in the combustion chamber(s) for mixing with fuel and air subsequently introduced into the combustion chamber.

8. An internal combustion engine as claimed in claim 6 wherein each inlet poppet valve is driven by the respective second inlet cam therefor when the engine operates a fifth operating condition in which every combustion chamber is active and operates in a four-stroke Otto cycle.

9. An internal combustion engine as claimed in claim 8 wherein each exhaust poppet valve is driven by the respective second exhaust cam therefor when the engine operates in the fifth operation condition in which every combustion chamber is active and operates a four-stroke Otto cycle.

10. An internal combustion engine as claimed in claim 6 comprising also a cam phasing mechanism which can alter the rotational position of a camshaft of the cam means relative to the crankshaft of the engine and thereby vary in timing opening and closing of the inlet and/or exhaust poppet valves.

11. An internal combustion engine comprising:
a plurality of combustion chambers;
an air induction system for delivering air to each combustion chamber;
a fuel system for delivering fuel to each combustion chamber;
an exhaust system for relaying combusted gases from the combustion chambers to atmosphere; and
an exhaust recirculation system to relay combusted gases from the exhaust system to at least one of the combustion chambers;
wherein:
the engine has a chamber deactivation operating mode in which at least one combustion chamber is active and receives fuel and air which are combusted therein and at least one other combustion chamber is deactivated and is supplied with no fuel by the fuel system;
in the said chamber deactivation operating mode the exhaust gas recirculation system supplies combusted gas to the (or each) deactivated combustion chamber;
electrically controlled inlet valve means control flow of air into the combustion chambers and electronic control means for varying operation of the inlet valve means having regard to engine load and/or engine speed;
the engine has a first operating condition in which every combustion chamber is active; and
the engine has a second operating condition in which the engine operates in the valve deactivation mode with at least one active combustion chamber operating a Miller cycle combustion cycle by closing the intake valve means thereof early to reduce in length each intake stroke whereby inducted charge is expanded before compression in the subsequent compression stroke.

12. An internal combustion engine comprising:
a plurality of combustion chambers;
an air induction system for delivering air to each combustion chamber;
a fuel system for delivering fuel to each combustion chamber;
an exhaust system for relaying combusted gases from the combustion chambers to atmosphere; and
a exhaust recirculation system to relay combusted gases from the exhaust system to at least one of the combustion chambers;
wherein:
the engine has a chamber deactivation operating mode in which at least one combustion chamber is active and receives fuel and air which are combusted therein and at least one other combustion chamber is deactivated and is supplied with no fuel by the fuel system;
in the said chamber deactivation operating mode the exhaust gas recirculation system supplies combusted gas to the (or each) deactivated combustion chamber;
electrically controlled inlet valve means control flow of air into the combustion chambers and electronic control means for varying operation of the inlet valve means having regard to engine load and/or engine speed;
the engine has a first operating condition in which every combustion chamber is active; and
the engine has a second operating condition in which the engine operates in the valve deactivation mode with at least one combustion chamber deactivated and with at least one active combustion chamber operating a Miller cycle combustion cycle by closing the intake valve means thereof early to reduce in length each intake stroke whereby inducted charge is expanded before compression in the subsequent compression stroke.

13. An internal combustion engine as claimed in claim 11 having electrically controlled exhaust valve means controlling flow of combusted gases from the combustion chambers and an electronic control means for varying operation of the exhaust valve means having regard to engine load and/or engine speed.

14. An internal combustion engine as claimed in claim 13 wherein the engine has a third operating condition in which every combustion chamber is active and operates controlled auto-ignition combustion by the exhaust valve means closing before the end of each exhaust stroke in each combustion chamber to trap combusted gases in the combustion chamber for mixing with fuel and air subsequently introduced into the combustion chamber.

15. An internal combustion engine as claimed in claim 13 in which the engine has a fourth operating condition in which the engine operates in the valve deactivation operating mode with at least one combustion chamber deactivated and at least one combustion chamber active and in which each active combustion chamber operates controlled auto-ignition combustion by the exhaust valve means closing before the end of each exhaust stroke in the combustion chamber to trap combusted gases in the combustion chamber for mixing with fuel and air subsequently introduced into the combustion chamber.

16. An internal combustion engine as claimed in claim 15 wherein the engine has a fifth operating condition in which every combustion chamber is active and operates a four stroke Otto cycle.

17. An internal combustion engine as claimed in claim 11 wherein the electrically controlled inlet valve means comprises electro-hydraulic actuators for opening inlet poppet valves of the engine.

18. An internal combustion engine as claimed in claim 13 wherein the electrically controlled exhaust valve means comprises electro-hydraulic actuators for opening exhaust poppet valves of the engine.

19. An internal combustion engine as claimed in claim 12 having electrically controlled exhaust valve means controlling flow of combusted gases from the combustion chambers and an electronic control means for varying operation of the exhaust valve means having regard to engine load and/or engine speed.

20. An internal combustion engine as claimed in claim 19 wherein the engine has a third operating condition in which every combustion chamber is active and operates controlled auto-ignition combustion by the exhaust valve means closing before the end of each exhaust stroke in each combustion chamber to trap combusted gases in the combustion chamber for mixing with fuel and air subsequently introduced into the combustion chamber.

21. An internal combustion engine as claimed in claim 19 in which the engine has a fourth operating condition in which the engine operates in the valve deactivation operating mode with at least one combustion chamber deactivated and at least one combustion chamber active and in which each active combustion chamber operates controlled auto-ignition combustion by the exhaust valve means closing before the end of each exhaust stroke in the combustion chamber to trap combusted gases in the combustion chamber for mixing with fuel and air subsequently introduced into the combustion chamber.

22. An internal combustion engine as claimed in claim 21 wherein the engine has a fifth operating condition in which every combustion chamber is active and operates a four stroke Otto cycle.

23. An internal combustion engine as claimed in claim 12 wherein the electrically controlled inlet valve means comprises electro-hydraulic actuators for opening inlet poppet valves of the engine.

24. An internal combustion engine as claimed in claim 23 wherein the electrically controlled exhaust valve means comprises electro-hydraulic actuators for opening exhaust poppet valves of the engine.

25. An internal combustion engine comprising:
a plurality of combustion chambers;
an air induction system for delivering air to each combustion chamber;
a fuel system for delivering fuel to each combustion chamber;
an exhaust system for relaying combusted gases from the combustion chambers to atmosphere; and
an exhaust recirculation system to relay combusted gases from the exhaust system to at least one of the combustion chambers;
wherein:
the engine has a chamber deactivation operating mode in which at least one combustion chamber is active and receives fuel and air which are combusted therein and at least one other combustion chamber is deactivated and is supplied with no fuel by the fuel system;
in the said chamber deactivation operating mode the exhaust gas recirculation system supplies combusted gas to the (or each) deactivated combustion chamber;
a plurality of exhaust poppet valves control flow of combusted gases from the combustion chamber and are operated by a rotatable camshaft having for each exhaust poppet valve a first exhaust cam and a second exhaust cam with a different profile to the first exhaust cam and tappet means is provided for each exhaust poppet valve to transmit lift to the exhaust poppet valve selectively from the first exhaust cam or the second exhaust cam;
in a first operating condition every combustion chamber is active; and
in a second operating condition the engine operates in the chamber deactivation operating mode with at least one combustion chamber is deactivated and at least one combustion chamber is active and each exhaust poppet valve for each active combustion chamber is driven by the respective first exhaust cam therefor so that each active combustion chamber operates controlled auto-ignition by each exhaust poppet valve closing early to reduce in length each exhaust stroke in the active combustion chamber(s) to thereby trap combusted gases in the combustion chamber(s) for mixing with fuel and air subsequently introduced into the combustion chamber.

26. An internal combustion engine as claimed in claim 25 wherein each inlet poppet valve is driven by the respective second inlet cam therefor when the engine operates a fifth operating condition in which every combustion chamber is active and operates in a four-stroke Otto cycle.

27. An internal combustion engine as claimed in claim 26 wherein each exhaust poppet valve is driven by the respective second exhaust cam therefor when the engine operates in the fifth operation condition in which every combustion chamber is active and operates a four-stroke Otto cycle.

28. An internal combustion engine as claimed in claim 25 comprising also a cam phasing mechanism which can alter the rotational position of a camshaft of the cam means relative to the crankshaft of the engine and thereby vary in timing opening and closing of the inlet and/or exhaust poppet valves.

29. An internal combustion engine comprising:
a plurality of combustion chambers;
an air induction system for delivering air to each combustion chamber;
a fuel system for delivering fuel to each combustion chamber;
an exhaust system for relaying combusted gases from the combustion chambers to atmosphere; and
an exhaust recirculation system to relay combusted gases from the exhaust system to at least one of the combustion chambers;
wherein:
the engine has a chamber deactivation operating mode in which at least one combustion chamber is active and receives fuel and air which are combusted therein and at least one other combustion chamber is deactivated and is supplied with no fuel by the fuel system;
wherein:
in the said chamber deactivation operation mode the exhaust gas recirculation system supplies combusted gas to the (or each) deactivated combustion chamber;
electrically controlled exhaust valve means control flow of combustion gases from the combustion chambers and an electronic control means for varying operation of the exhaust valve means having regard to engine load and/or engine speed; and
the engine has a first operating condition in which every combustion chamber is active; and
the engine has a second operating condition in which the engine operates in the valve deactivation operating mode with at least one combustion chamber deactivated and at least one combustion chamber active and in which each active combustion chamber operates controlled auto-ignition combustion by the exhaust valve means closing before the end of each exhaust stroke in the combustion chamber to trap combusted gases in the combustion chamber for mixing with fuel and air subsequently introduced into the combustion chamber.

30. An internal combustion engine as claimed in claim 29 wherein the engine has a fifth operating condition in which every combustion chamber is active and operates a four stroke Otto cycle.

31. An internal combustion engine as claimed in claim 29 wherein the electrically controlled exhaust valve means comprises electro-hydraulic actuators for opening exhaust poppet valves of the engine.

* * * * *